No. 845,531. PATENTED FEB. 26, 1907.
W. M. DAVISON.
LIQUID MEASURING AND REGISTERING FAUCET.
APPLICATION FILED MAR. 22, 1906.
2 SHEETS—SHEET 1.
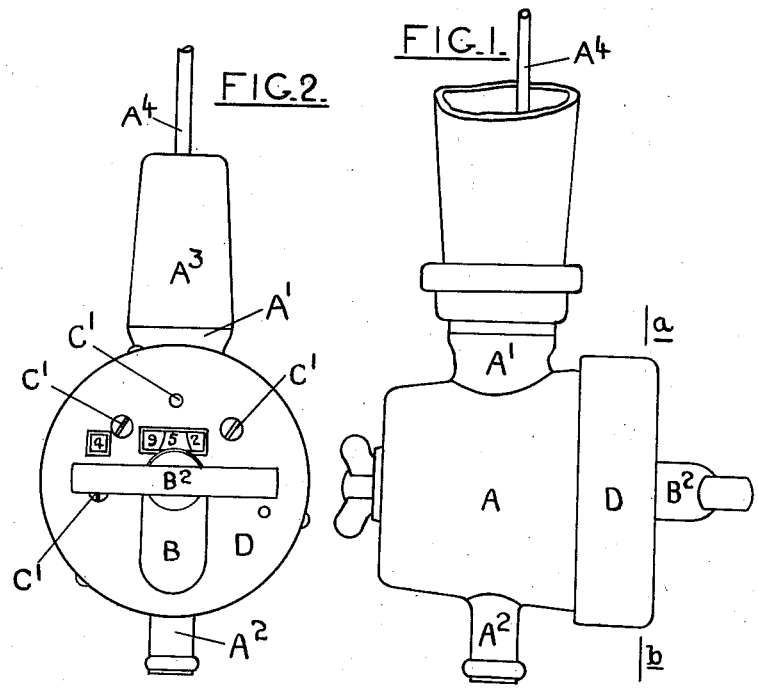
WITNESSES:
W. M. Avery
A. H. Davis
INVENTOR
William Miller Davison
BY
Munn & Co
ATTORNEYS No. 845,531. PATENTED FEB. 26, 1907.
W. M. DAVISON.
LIQUID MEASURING AND REGISTERING FAUCET.
APPLICATION FILED MAR. 22, 1906.
2 SHEETS—SHEET 2.
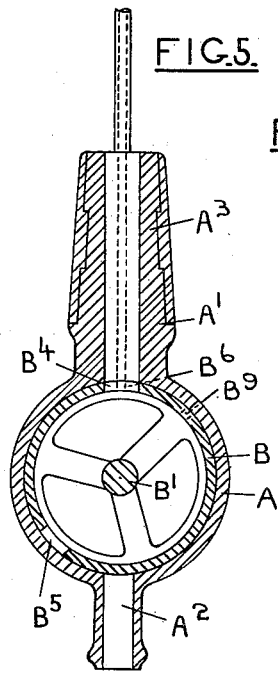
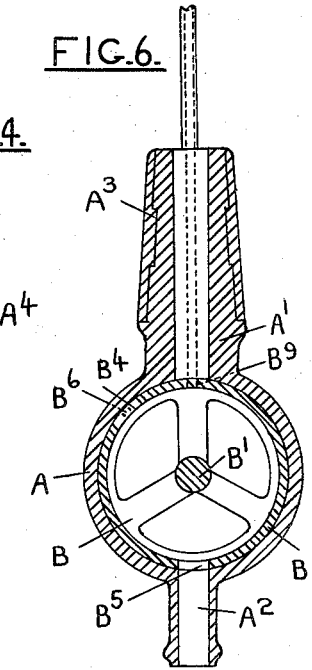
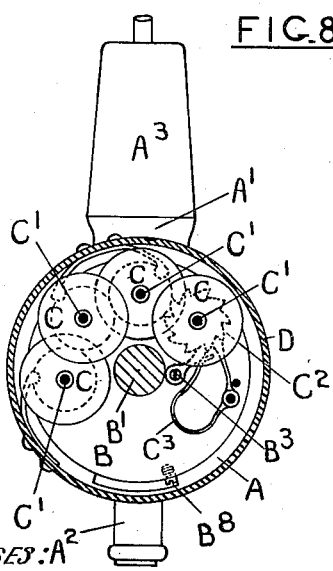
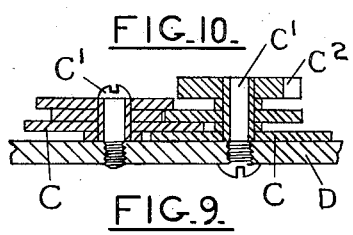
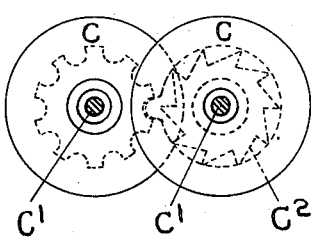
INVENTOR
William Miller Davison
BY
Munn & Co
ATTORNEYS
WITNESSES:
W. M. Avery
A. H. Davis

UNITED STATES PATENT OFFICE.

WILLIAM MILLER DAVISON, OF PORT PIRIE, SOUTH AUSTRALIA, AUSTRALIA.

LIQUID MEASURING AND REGISTERING FAUCET.

No. 845,531.      Specification of Letters Patent.      Patented Feb. 26, 1907.

Application filed March 22, 1906. Serial No. 307,395.

*To all whom it may concern:*

Be it known that I, WILLIAM MILLER DAVISON, engineer, a subject of the King of Great Britain and Ireland, residing at Government Road, Port Pirie West Extension, Port Pirie, State of South Australia, Commonwealth of Australia, have invented a certain new and useful Improved Device for Vending Measured Quantities of Liquid and for Recording the Number of Measures Sold, of which the following is a specification.

This invention comprises a device whereby publicans and others are enabled to accurately measure out desired quantities of liquids—such, for instance, as "nobblers"—and at the same time a record is kept of the number of such measures sold.

It is especially useful as a check upon bar attendants.

My device consists, essentially, of a measuring plug or chamber fitted within a body or case, at one end of which is a registered mechanism operated by the movement of the measuring plug or chamber. The body has on one side a tubular inlet projection, whereby it is fitted to the neck of the bottle, the barrel, or other liquid-containing vessel and has on the other side an outlet-spout, from which the liquid is delivered into the glass or other receptacle.

The device is fitted to the bottle or other vessel containing the liquid and the bottle placed, either by itself or with others similarly fitted, upside down in a rack, into which it or they are then locked, the key being retained by the owner. The rack is placed in a convenient position upon the bar or elsewhere.

My device may be constructed with suitable modifications and of the necessary sizes as will enable it to be applied to barrels and other vessels to measure and register "pints", "butchers," and glasses of any size required.

In order that my invention may be clearly understood, I will describe the same with reference to the accompanying drawings, in which—

Figures 1 and 2 are outside views, Fig. 1 showing the device fitted onto a bottle-neck. Fig. 3 is a central section lengthwise of the chamber. Fig. 4 is a view, partly in section, of the telescopic end of the air-tube $A^4$. Figs. 5 and 6 are central sections across the chamber. Fig. 5 shows the chamber in communication with the bottle for filling, and Fig. 6 shows it in communication with the outlet for discharging. Fig. 7 is a sectional view showing the device fitted to a cask by means of a nipple or socket-piece. The nipple is permanently secured in the head of the cask and for transport purposes is closed by a suitable cap. The air-tube in this case is carried to the other end of the cask and its end held in a block provided for the purpose. Fig. 8 is a sectional view on line $a\, b$ of Fig. 1 immediately within the cap or cover, showing the registering mechanism. Figs. 9 and 10 are front and sectional views, respectively, of portion of the registering mechanism, showing in dotted lines one of the ten-toothed spur-wheels and the finger for engaging same and showing also the ratchet-wheel. These figures are drawn to a larger scale than the others.

A is the case or body, made, preferably, of a metal not affected by spirits, having a tubular inlet projection $A'$ on one side adapted to fit into the bottle-neck and an outlet-spout $A^2$ on the opposite side. The projection $A'$ is preferably fitted with a collar $A^3$ of resilient material, such as cork or rubber.

Within the body A is a measuring-chamber B, constructed to contain the desired quantity of liquid—say a nobbler. The chamber is formed about a central stem $B'$, one end of which passes through the small end of the body A and is fitted with a nut and washer, whereby it is held in place. The larger end of the chamber is closed and carries the operating-handle $B^2$. In the chamber-wall are two openings $B^4$ and $B^5$, which register, respectively and alternately, with the openings in the inlet projection $A'$ and in the outlet-spout $A^2$ of the body, according to the position of the chamber, as hereinafter described. The chamber-wall has also three air-holes $B^6$, $B^9$, and $B^7$, the two former of which register alternately with an air-pipe $A^4$, passing through the projection $A'$, and the latter registers with a hole $A^5$ in the body, as hereafter described. The end of the pipe $A^4$ is made telescopic, so that it may be adjusted in length to suit different-sized bottles. $B^8$ is a stop to limit the movement of chamber in each direction.

The registering mechanism consists of a series of numbered disks C and train of spur-wheels and operating-fingers secured upon sleeves or hollow spindles carried upon pivot-pins C', projecting from an outside cap or cover D, secured upon the end of the body, the registering mechanism being inclosed within the cover, but outside of the chamber, and the register-numbers being exposed through openings in the same. The register-numbers are not displayed, except on Fig. 2. The sleeve of the units-wheel has upon its other end a ratchet-wheel $C^2$, worked by a pawl $B^3$, carried upon the end of the plug or chamber, and moved therewith as it is turned to and fro. Secured to the cap or cover adjacent to this ratchet-wheel and its operative pawl is a double spring $C^3$, one end of which keeps the pawl $B^3$ in engagement with the ratchet-wheel, and the other serves as a check-pawl to the ratchet-wheel. The sleeve of the units-disk carries a finger, which as it rotates engages a ten-toothed spur-wheel upon the sleeve of the tens-disk. The sleeve of the tens-disk carries a finger, which as it rotates engages a ten-toothed spur-wheel upon the sleeve of the hundreds-disk, and the sleeve of the hundreds-disk carries a finger which as it rotates engages a ten-toothed spur-wheel upon the sleeve of the thousands-disk. Each of the spur-wheels is engaged and held by a check-spring, except when being operated by its respective finger. The cap is provided with a slotted opening, which enables it to be brought into position over the handle $B^2$, and it is secured in place upon the end of the body by screws.

The operation of my invention is as follows: The bottle having been opened, the device is affixed and the bottle locked into a suitable rack upside down. To draw a measure of liquid, the chamber is turned, by means of the handle $B^2$, into the position shown in Fig. 5, wherein the opening $B^4$ registers with the opening in the inlet A', when the liquid will flow into and fill the chamber, the air passing from the chamber through the hole $B^6$ and pipe $A^4$ into the bottle. To discharge the liquid into a glass, the chamber is turned, by means of the handle $B^2$, into the position shown in Fig. 6, wherein the outlet $B^5$ registers with the opening in the outlet-spout $A^2$, when the liquid will flow out of the chamber and air enter through the holes $A^5$ and $B^7$, which now register. At the same time the hole $B^9$ registers with the lower end of the pipe $A^4$ and allows any liquid which may have entered the pipe when filling the chamber to drain therefrom. The registering mechanism operates as follows: As the chamber B is turned to receive a measure of liquid the pawl $B^3$ is drawn back with it over the top of the adjacent tooth of the ratchet-wheel $C^2$ and is caused by the pressure of the spring $C^3$ to fall into engagement with the next tooth. As the chamber B is turned to discharge the liquid the pawl $B^3$ is thrust forward, turning the ratchet-wheel $C^2$, and with it the disk C, and altering the register-number. Upon the tenth movement of the units-wheel its attached finger engages the adjacent tooth on the spur-wheel of the tens-disk and that is moved on. Similarly, the hundreds-disk and thousands-disk are operated by the tenth movement of the fingers of the tens-disk and hundreds-disk, respectively. There is no need to reset the register, since after registering "9999" it begins again at "0," and so on indefinitely.

Having now fully described and ascertained my said invention and the manner in which it is to be performed, I declare that what I claim is—

1. In a liquid measuring and registering device, comprising a hollow body provided with an air-hole, and having a tubular inlet and outlet and an air-tube for leading into the bottle or vessel, a measuring-chamber having separate inlet and outlet openings contained within said hollow body and having air-holes adapted to register respectively with said air-tube leading into the bottle or vessel and with the air-hole in the body, a cap or cover on the end of said body, and a registering mechanism mounted within the cap or cover and a pawl carried by said measuring-chamber for operating the registering mechanism.

2. In a liquid measuring and registering device, comprising a hollow body provided with an air-hole and having a tubular inlet and outlet, and an air-tube for leading into the bottle or vessel, a measuring-chamber in the body constructed to contain a predetermined quantity of liquid, said chamber being provided with separate inlet and outlet openings adapted to register with the inlet and outlet openings respectively of the body of the device, said body having an air-tube for leading into the vessel, and said chamber having air-holes adapted to register respectively with the air-tube and with the air-hole in the body, a cap or cover upon the body of the device, a registering mechanism mounted within the cap or cover and provided with a ratchet-wheel, and a pawl on the measuring-chamber for operating the ratchet-wheel.

3. The combination with a bottle or liquid-containing vessel of a liquid measuring and registering device consisting of a hollow body having an air-hole and provided with tubular inlet and outlet, an air-tube for extending into the bottle or vessel, an oscillatable measuring-chamber contained within such hollow body and having separate inlet and outlet openings and three air-holes two of which are adapted to register alternately with the air-tube, and the third to register with the air-hole in the body a cap or cover on the end of the body and a registering mechanism mounted upon the inside of a cap or cover and a pawl carried upon the outside of such measuring-chamber for operating said registering mechanism subtantially as described and for the purpose set forth.

4. The combination with a bottle or liquid-containing vessel of a liquid measuring and registering device consisting of a hollow body provided with tubular inlet and outlet, an air-tube for extending into the bottle or vessel, an oscillatable measuring-chamber contained within such hollow body and having separate inlet and outlet openings and three air-holes, two of which as the chamber is oscillated register alternately with the air-tube, and the third when the chamber is discharging registers with the air-hole in the body, a cap or cover on the end of said body a pawl mounted upon the outside of such chamber and beneath the cap or cover and a registering mechanism comprising a series of numbered disks with a train of spur-wheels and operating-fingers mounted upon the inside of a cap or cover upon the end of such body outside the chamber, the units-wheel of the series having a ratchet-wheel operated by the aforesaid pawl carried by the measuring-chamber substantially as described.

In testimony that I claim the foregoing as my invention I have signed my name, in the presence of two subscribing witnesses, this 6th day of February, 1906.

WILLIAM MILLER DAVISON.

Witnesses:
ARTHUR GORE COLLISON,
GLADYS CLARE WILLIAMS.